United States Patent
Itabashi et al.

(10) Patent No.: US 10,501,328 B2
(45) Date of Patent: Dec. 10, 2019

(54) METHOD FOR PRODUCING BETA ZEOLITE

(71) Applicants: UNIZEO CO., LTD., Tokyo (JP); The University of Tokyo, Tokyo (JP)

(72) Inventors: Keiji Itabashi, Tokyo (JP); Shanmugam Palani Elangovan, Tokyo (JP); Kyosuke Sodeyama, Tokyo (JP); Tatsuya Okubo, Tokyo (JP)

(73) Assignees: Mistui Mining & Smelting Co., Ltd., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 15/549,458

(22) PCT Filed: Feb. 8, 2016

(86) PCT No.: PCT/JP2016/053660
§ 371 (c)(1),
(2) Date: Aug. 8, 2017

(87) PCT Pub. No.: WO2016/129555
PCT Pub. Date: Aug. 18, 2016

(65) Prior Publication Data
US 2018/0022612 A1 Jan. 25, 2018

(30) Foreign Application Priority Data
Feb. 9, 2015 (JP) .................................. 2015-023675

(51) Int. Cl.
*C01B 39/46* (2006.01)
*B01J 29/70* (2006.01)

(52) U.S. Cl.
CPC ........... *C01B 39/46* (2013.01); *B01J 29/7007* (2013.01)

(58) Field of Classification Search
CPC ....... C01B 39/46; C01B 39/48; B01J 29/7007
See application file for complete search history.

(56) References Cited

U.S. PATENT DOCUMENTS

| 3,308,069 A | 3/1967 | Wadlinger et al. |
| 3,886,094 A | 5/1975 | Pilato et al. |

(Continued)

FOREIGN PATENT DOCUMENTS

| CN | 101249968 A | 8/2008 |
| CN | 102712489 A | 10/2012 |

(Continued)

OTHER PUBLICATIONS

Kamimura et al, "Crystallization Behavoir of Zeolite Beeta in OSDA-Free, Seed-Assited Synthesis", J. Phys. Chem. C, vol. 115, pp. 744-750 (2011) (Year: 2011).*

(Continued)

*Primary Examiner* — David M Brunsman
(74) *Attorney, Agent, or Firm* — Locke Lord LLP; James E. Armstrong, IV; Nicholas J. DiCeglie, Jr.

(57) ABSTRACT

Provided is a method for producing a beta zeolite, which is a seed crystal addition method that is capable of reducing the environmental load as much as possible. A method for producing a beta zeolite according to the present invention comprises a step wherein a reaction mixture that contains a silica source, an alumina source, an alkali source and water and a seed crystal that is composed of a beta zeolite are mixed with each other and heated. A beta zeolite which comprises particles having a particle size of 10 μm or less in an amount of 90% or more on a volume basis in the particle size distribution as determined by a laser diffraction/scattering particle size distribution measuring method, and which is synthesized without using an organic structure-directing agent is used as the seed crystal.

20 Claims, 7 Drawing Sheets

(56) References Cited

U.S. PATENT DOCUMENTS

| | | | |
|---|---|---|---|
| 4,530,824 | A | 7/1985 | Arika et al. |
| 4,562,055 | A | 12/1985 | Arika et al. |
| 4,664,898 | A | 5/1987 | Arika et al. |
| 4,687,653 | A | 8/1987 | Arika et al. |
| 4,923,690 | A | 5/1990 | Valyocsik et al. |
| 5,427,765 | A | 6/1995 | Inoue et al. |
| 8,282,908 | B2 | 10/2012 | Itabashi et al. |
| 9,108,187 | B2 | 8/2015 | Ogura et al. |
| 2012/0190534 | A1 | 7/2012 | Itabashi et al. |
| 2014/0157987 | A1 | 6/2014 | Ogura et al. |

FOREIGN PATENT DOCUMENTS

| | | | |
|---|---|---|---|
| DE | 112012000495 | T5 | 10/2013 |
| EP | 2457872 | A1 | 5/2012 |
| EP | 2876086 | A1 | 5/2018 |
| JP | 63-001244 | B2 | 1/1988 |
| JP | 63-046007 | B2 | 9/1988 |
| JP | 02-032204 | A | 7/1990 |
| JP | 02-044771 | B2 | 10/1990 |
| JP | 02-047403 | B2 | 10/1990 |
| JP | 02-045009 | B2 | 7/1991 |
| JP | 03-053251 | B2 | 8/1991 |
| JP | 06-287015 | A | 10/1994 |
| JP | 09-175818 | A | 7/1997 |
| JP | 2012-045483 | A | 3/2012 |
| WO | 2011/013560 | A1 | 2/2011 |
| WO | 2014/013967 | A1 | 1/2014 |

OTHER PUBLICATIONS

Extended European Search Report dated May 9, 2018, issued to EP Patent Application No. 16749199.2.

Ch. Baerlocher et al., "Atlas of Zeolite Framework Types," Published on behalf of the Structure Commission of the International Zeolite Association, 2007, p. 72-73 and a cover page. (discussed in the spec).

M. M. J. Treacy et al., "Collection of Simulated XRD Powder Patterns for Zeolites," Published on behalf of the Structure Commission of the International Zeolite Association, 2007, p. 82-83, p. 480 and a cover page. (discussed in the spec).

Ramesh B. Borade et al., "Preparation of aluminum-rich Beta zeolite," Microporous Materials, vol. 5, 1996, p. 289-297. (discussed in the spec).

Bin Xie et al., "Organotemplate-Free and Fast Route for Synthesizing Beta Zeolite," Chemistry of Materials, vol. 20, No. 14, 2008, p. 4533-4535. (cited in the ISR and discussed in the spec).

Yoshihiro Kamimura et al., "Critical Factors in the Seed-Assisted Synthesis of Zeolite Beta and "Green Beta" from OSDA-Free Na+-Aluminosilicate Gels," Chemistry-An Asian Journal, vol. 5, 2010, p. 2182-2191. (discussed in the spec).

International Search Report dated Mar. 8, 2016, issued for PCT/JP2016/053660.

Office Action issued in corresponding Chinese Patent Application No. CN201680009218.0, dated Jul. 10, 2019.

* cited by examiner

METHOD FOR PRODUCING BETA ZEOLITE

TECHNICAL FIELD

The present invention relates to a method for producing a beta zeolite.

BACKGROUND ART

A synthetic zeolite is crystalline aluminosilicate, and has uniform pores with angstrom size that are attributed to a crystal structure. Taking advantage of such a feature, the synthetic zeolite is industrially used as a molecular sieving adsorbent that adsorbs only a molecule having a specific size, an adsorption separating agent that adsorbs a molecule having strong affinity, and a catalyst material. A beta zeolite that is one of such zeolites is currently used in quantity as a catalyst in the petrochemical industry or an adsorbent for vehicle exhaust gas treatment throughout the world. The characteristic of the beta zeolite is that the zeolite has pores of a 12-membered ring in a three-dimensional direction, as disclosed in Non Patent Document 1. Moreover, the X-ray diffraction pattern showing its structural characteristics is disclosed in Non Patent Document 2.

A method of synthesizing the beta zeolite is variously proposed. A typical method is a method of using a tetraethylammonium ion, as an organic structure-directing agent (hereinafter abbreviated to "OSDA"). Such methods are disclosed in, for instance, Patent Documents 1 to 3 and Non Patent Document 3 below. According to these methods, the beta zeolite having a $SiO_2/Al_2O_3$ ratio of 1 to 400 can be obtained. However, a compound containing the tetraethylammonium ion is expensive, and what is more, most of the compound is decomposed after beta zeolite crystallization is terminated. As such, it is impossible to recover and reuse the compound. For this reason, the beta zeolite produced by such a method is expensive. Furthermore, since the tetraethylammonium ion is incorporated into a crystal of the beta zeolite, it is necessary to calcine the beta zeolite to remove the tetraethylammonium ion when the beta zeolite is used as the adsorbent or the catalyst. In that case, exhaust gases are responsible for environmental pollution, and further, many chemicals are required for detoxification treatment of a synthetic mother liquid. In this way, the method of synthesizing the beta zeolite using the tetraethylammonium ion is not only an expensive method but also a production method having a great environmental load. As such, there is a need to realize a production method of using no OSDA.

Under such circumstances, a method for producing a beta zeolite using no OSDA has been proposed in Non Patent Document 4. In this method, the beta zeolite synthesized using tetraethylammonium ions is calcined to remove organic components and the obtained product is used as a seed crystal. The seed crystal is added to a sodium aluminosilicate reaction mixture containing no organic substance, a hydrothermal treatment is performed, and thereby crystallization is performed. However, in this method, as long as the beta zeolite synthesized by using tetraethylammonium ions is calcined and the obtained product is used as a seed crystal, the tetraethylammonium ions as OSDA are always needed, though the used amount is reduced. Moreover, in the above-mentioned document, only one type of seed crystal is disclosed, and regarding the composition of the sodium aluminosilicate reaction mixture, only one example is shown in which numerical values are limited. Therefore, although the composition of the synthesized beta zeolite is not disclosed in the above-mentioned document, it is considered that the composition has only determined values.

On the other hand, Patent Document 4 by the authors of Non-Patent Document 4 discloses a $SiO_2/Al_2O_3$ ratio of a seed crystal, and further Patent Document 4 discloses a composition of a sodium aluminosilicate reaction mixture not as a single discrete composition but as a narrow range which differs to defining the mixture as a single discrete composition. However, the technique disclosed in Patent Document 4 is basically the same technique as that of Non-Patent Document 4, and the range of the composition of the reaction mixture is so narrow that the $SiO_2/Al_2O_3$ ratio of the zeolite is limited to only a limited range. In order to meet various demands, a zeolite having a wide range of $SiO_2/Al_2O_3$ ratio is desirable. Moreover, establishment of a condition allowing synthesis by stirring is desired for industrial mass production. In order to reduce the environmental load as much as possible, a proposal of a new process for producing a beta zeolite is desired, in which a seed crystal which need not be calcined is used and no OSDA is used.

Thereafter, as described in Patent Document 5 and Non-Patent Document 5, conditions under which the synthesis can be performed in a wider composition range of the reaction mixture were found by the present inventors, and the $SiO_2/Al_2O_3$ ratio of the obtained beta zeolite was also expanded. In addition, Patent Document 5 and Non-patent Document 5 disclose a method for synthesizing a beta zeolite using no OSDA, wherein a beta zeolite is synthesized by adding a seed crystal without using an OSDA and further the synthesized beta zeolite is added again as the seed crystal by way of recycling. Since this method is a green process in which no OSDA is essentially used and environmental load is ultimately small, it is possible to synthesize a so-called "green beta zeolite" by this method.

Patent Document 1: U.S. Pat. No. 3,308,069
Patent Document 2: U.S. Pat. No. 4,923,690
Patent Document 3: Japanese Unexamined Patent Application, Publication No. H09-175818
Patent Document 4: Chinese Published Patent Application Publication, No. 01249968, Specification
Patent Document 5: PCT International Publication No. WO2011/013560
Non Patent Document 1: Ch. Baerlocher, L. B. McCusker, D. H. Olson, Atlas of Zeolite Framework Types, Published on behalf of the Commission of the International Zeolite Association, 2007, pp. 72-73
Non Patent Document 2: M. M. J. Treacy and J. B. Higgins, Collection of Simulated XRD Powder Patterns for Zeolites, Published on behalf of the Commission of the International Zeolite Association, 2007, pp. 82-83 and p. 480
Non Patent Document 3: Microporous Materials, Vol. 5, p. 289-297 (1996)
Non Patent Document 4: Chemistry of Materials, Vol. 20, No. 14, pp. 4533-4535 (2008)
Non Patent Document 5: Chemistry—An Asian Journal, Vol. 5, pp. 2182-2191 (2010)

DISCLOSURE OF THE INVENTION

Problems to be Solved by the Invention

FIG. 1 shows a synthesis method of a beta zeolite in which an OSDA is used. As shown in FIG. 1, according to conventional methods, a beta zeolite is produced in an order of <1>, <2> and <3>. Additionally, in the method indicated in Patent Document 4 and Non Patent Document 4, the beta zeolite is produced in an order of <1>, <2>, <3>, <4>, <5>, <6> and <9>. In this method, use of a seed crystal is essential, and for the production of the seed crystal, an OSDA of tetraethylammonium ions is essential. Moreover, it is necessary to remove the tetraethylammonium ions by calcination at a high temperature.

Contrary to this method, Patent Document 5 discloses six production methods. In one of the methods, likewise to the afore-mentioned method, the beta zeolite is produced in an order of <1>, <2>, <3>, <4>, <5>, <6> and <9>, but the $SiO_2/Al_2O_3$ ratio of the seed crystal and the composition of the reaction mixture are different from those of conventional methods. Therefore, it is possible to produce a beta zeolite having a wide range of $SiO_2/Al_2O_3$ ratio. In the second method, the seed crystal is produced in an order of <1>, <2>, <3>, <4>, <5>, <7>, <6> and <9> and in this method, the seed crystal is subjected to aging, followed by statically heating, and thereby the seed crystal having a low $SiO_2/Al_2O_3$ ratio can be effectively used. In the third method, the seed crystal is produced in an order of <1>, <2>, <3>, <4>, <5>, <7> <8> and <9>.

Further, Patent Document 5 discloses that it is also possible to produce the beta zeolite in an order of <10>, <5>, <6> and <9>; in an order of <10>, <5>, <7>, <6> and <9>; and in an order of <10>, <5>, <7>, <8> and <9>. Since these three methods are production processes in which the beta zeolite obtained by the method without OSDA is employed as a seed crystal, it is possible to produce a beta zeolite and a seed crystal thereof even though no OSDA is essentially used. These three production methods can be said to be a production method of a beta zeolite by a green process which ultimately has a small environmental load. Namely, the "green beta zeolite" can be produced for the first time by these methods. However, thus far, it has not been clarified what conditions are preferred for the seed crystal of beta zeolite which are required to produce a beta zeolite and a seed crystal thereof essentially without using an OSDA.

Thus, the object of the present invention is to reveal preferred conditions for the seed crystal of beta zeolite which are required to produce a beta zeolite and a seed crystal thereof essentially without using an OSDA; and to provide a production method of a beta zeolite, comprising addition of a seed crystal which can decrease environmental load as much as possible.

Means for Solving the Problems

As a result of extensive research, the present inventors could reveal the preferred conditions for the crystal seed of beta zeolite which are required for the production of a beta zeolite and a seed crystal thereof essentially without using an OSDA, and have completed the present invention.

In other words, the afore-mentioned problem is solved by providing the present invention directed to a production method of a beta zeolite, comprising mixing a reaction mixture comprising a silica source, an alumina source, an alkali source and water with a seed crystal consisting of a beta zeolite and heating the mixture, wherein the beta zeolite which is synthesized using no organic structure-directing agent and which comprises particles having a particle size of 10 μm or less in an amount of 90% or more on a volume basis in the particle size distribution as determined by a laser diffraction/scattering particle size distribution measuring method is used as a seed crystal.

Effects of the Invention

According to the present invention, a beta zeolite production method comprising addition of a seed crystal, which can decrease environmental load as much as possible, is provided.

PREFERRED MODE FOR CARRYING OUT THE INVENTION

Below, the present invention is explained based on the preferred embodiment thereof. The production method of a green beta according to the present embodiment is a production method comprising the step of mixing a reaction mixture comprising a silica source, an alumina source, an alkali source and water with a seed crystal consisting of a beta zeolite and heating the mixture, wherein a beta zeolite which is synthesized using no organic structure-directing agent and which comprises particles having a particle size of 10 μm or less in an amount of 90% or more on a volume basis in the particle size distribution as determined by a laser diffraction/scattering particle size distribution measuring method is used as a seed crystal. The present inventors infer that growth of crystals occurs on the surface of a seed crystal in the production method of a green beta. Therefore, it is inferred that the greater the active surface area of the seed crystal, the more effective the addition of seed crystal. In order to increase the surface area of a crystal, it is effective to decrease particle size of the crystal.

Incidentally, since a synthetic zeolite is generally synthesized as crystals in a state where single crystals having different sizes are aggregated, it is not easy to obtain a particle size distribution of all single crystal but it is possible to obtain particle size distribution of crystal particles comprising aggregated particles. Given the above, the present inventors have intensively studied the correlation between the particle size distribution of the seed crystal of beta zeolite and crystallization conditions, crystallinity, purity, and pore characteristics of green beta. As a result, the present inventors have succeeded in obtaining the most appropriate particle size distribution of the seed crystal of the beta zeolite required for the production of the beta zeolite and the seed crystal thereof essentially without using an OSDA.

Figure 1:
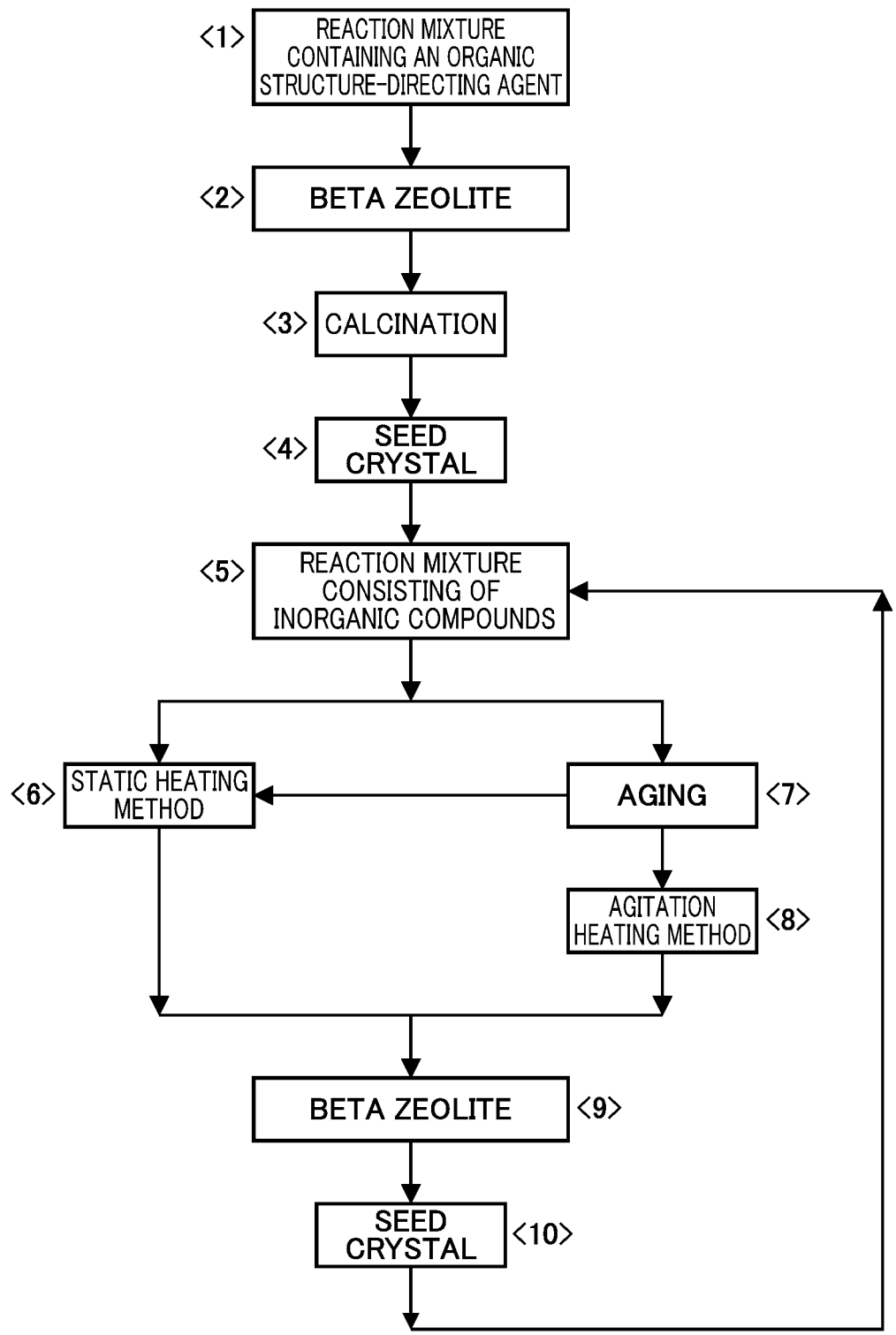
FIG. 1 is a flow chart of a method for synthesizing a beta zeolite.

The method for obtaining the seed crystal of the beta zeolite which can be used in the present embodiment and which has a controlled particle size distribution, namely <10> of FIG. 1, is, for instance, as follows. One method is a method wherein only a beta zeolite having a preferred crystal particle size distribution is separated from the beta zeolite obtained by the above-described conventional methods, namely out of <9> of FIG. 1, and the separated beta zeolite is used as a seed crystal (<10> of FIG. 1). This seed crystal is synthesized using no OSDA.

The method for obtaining a seed crystal (<10> of FIG. 1) having a preferred crystal particle distribution separated from the beta zeolite synthesized using no OSDA according to the conventional method, namely from <9> of FIG. 1 is, for instance, as stated below. Namely, (i) a method of separating only crystal particles having a small particle size by adjusting the opening size of filtration cloth used in filtration or (ii) a sedimentation separation method by using beta zeolite slurry in which crystals are dispersed is effective. Further, (iii) separation by a dry method is also possible.

The crystal particle size distribution of the beta zeolite synthesized by the method comprising addition of a seed crystal without using an OSDA (<9> of FIG. 1) generally ranges over a wide range of from about 10 nm to 100 μm or more. If this is used as a seed crystal as it is, when the peak of the crystal particle size distribution is shifted toward a small particle size side and majority of the particles exist in the small particle size side, crystal surface area increases and such a seed crystal effectively acts as a seed crystal. On the other hand, when the peak of the crystal particle size distribution is shifted toward the large particle size side and majority of the particles exist in the large particle size side, crystal surface area decreases and the effect as a seed crystal decreases. The seed crystal of the beta zeolite which is usable in the present embodiment, for instance, <10> of FIG. 1, comprises particles having a particle size of 10 μm or less in an amount of 90% or more on a volume basis in the particle size distribution as determined by a laser diffraction/scattering particle size distribution measuring method. Namely, the volume accumulation particle size $D_{90}$ at accumulation volume of 90 volume % is 10 μm or less. In particular, the particles having a particle size of 10 μm or less account for preferably 93% or more on a volume basis, and more preferably 93.5% or more. The desired green beta can be successfully obtained by using the seed crystal of the beta zeolite which has the particle size distribution as described above and which has been synthesized without using an OSDA and by mixing this with the afore-mentioned reaction mixtures and heating.

Incidentally, although the green beta is also formed in Patent Document 5 and Non-Patent Document 5 described above, the synthesis conditions of the green beta adopted in these documents differ from the production conditions of the present embodiment. In these documents, the beta zeolite particles which have been synthesized without using an OSDA and whose $D_{90}$ on a volume basis is 10 μm or less are not used as the seed crystal. The reason why the green beta was nevertheless formed under the conditions that the conditions of the present embodiment were not employed in these documents is unclear, but as the reason for this, a high alkali concentration region is adopted as the synthesis conditions of the green beta in these documents. The present inventors estimate that the surface of the seed crystal dissolved during crystallization reaction and thereby the particle size of the seed crystal substantially decreased.

Although the measuring device in the laser diffraction/scattering particle size distribution measuring method is not particularly limited, so far as the particle size distribution of the seed crystal can be measured, for instance, the nano particle size analyzer manufactured by Shimadzu Corporation (product name: SALD-7500nano) can be used. When using this analyzer, it is preferred that the object to be measured is dispersed in water. The dispersion is a dilute liquid and it is possible for the analyzer to automatically judge whether or not a particular concentration is appropriate as the object to be measured.

In the present embodiment, it is also possible to further use, as the seed crystal, the calcined seed crystal (Z2) of the beta zeolite synthesized using an OSDA, in addition to the beta zeolite (Z1) synthesized without using an OSDA. Such a calcined seed crystal corresponds to <4> of FIG. 1. It is clear from Patent Document 4 and Non-Patent Documents 4 and 5 as well as the results of the above discussions by the present inventors that the seed crystal of <4> in FIG. 1 is effective in the synthesis of beta zeolite of <9>, regardless of the crystal particle size distribution, so long as the seed crystal of <4> in FIG. 1 is the one obtained by a general synthesis method. Therefore, in the synthesis of the green beta according to the present embodiment, it is possible to use 100% of the seed crystal of <10> in FIG. 1 to be added to a reaction mixture, and it is also possible to use a mixture of the seed crystal of <10> and the seed crystal of <4>, in FIG. 1. It is possible to produce the green beta by combined use of the calcined and controlling the particle size of the seed crystal of <4>, and the obtained crystal of <10> which is a beta zeolite synthesized without using an OSDA. In this case, the value of the ratio of the seed crystal of <10> relative to the mixture of the seed crystal Z1 of <10> and the seed crystal Z2 of <4>, namely Z1/(Z1+Z2)×100, is preferably 10% by mass or more and 100% by mass or less, more preferably 25% by mass or more and 100% by mass or less. When the ratio of the seed crystal of <10> relative to the mixture of the seed crystal Z1 of <10> and the seed crystal Z2 of <4> is 10% by mass or more, the effects of simultaneously decreasing environmental load and production costs can be reduced and therefore, in the present specification, such a product is also referred to as a green beta.

A mixed amount of the seed crystal (also referred to as an added amount) (when Z2 described above is used, the total of Z1 and Z2) is preferably 1% by mass or more and 30% by mass or less relative to the mass of the silica source contained in the reaction mixture, namely the mass obtained by converting the mass of silicon contained in the reaction mixture to the mass of $SiO_2$. Although it is generally preferred that the added amount of the seed crystal is small in this range, the added amount of the seed crystal is decided in the consideration of reaction rate or suppression effect of impurities and the like. Form this viewpoint, it is more preferred that the added amount of the seed crystal is 1% by mass or more and 10% by mass or less relative to the mass of the silica source contained in the reaction mixture.

The seed crystal Z1 may be added to the reaction mixture in a state of solid or in a state of solid-liquid mixture containing the seed crystal. In this case, when seed crystal Z2 is used in addition to the afore-mentioned seed crystal Z1 as the seed crystal, it is possible to use a solid-liquid mixture obtained by adding and mixing the seed crystal Z2 to the seed crystal Z1. As described above, since the seed crystal used in the present embodiment is fine particles, when this is used in a state of solid, dust generation sometimes occurs and handleability is sometimes poor. Contrary to this, if the seed crystal is used in a state of solid-liquid mixture, such inconvenience can be easily avoided. As a solvent when using the solid-liquid mixture, using water is preferred from the viewpoint of safety and economic performance.

When the seed crystal is used in the state of solid-liquid mixture, first of all, 1) the reaction mixture containing the beta zeolite of <9> in FIG. 1 is taken out. Subsequently, 2) crude particles of 10 μm or more are separated by using a sedimentation and settling separation apparatus such as a liquid cyclone, a filtration separation device such as a vacuum filtration device, or a centrifugal separator. Filtration using filtration cloth is also effective. Successively, 3) excessive liquid phase is removed resulting in a more concentrated slurry. In the thus-obtained solid-liquid mixture, the seed crystal Z1 of <10> exits. Thereafter, if necessary, 4) the seed crystal Z2 is added and mixed to the solid-liquid mixture to obtain a final solid-liquid mixture as a seed crystal source. Incidentally, when such solid-liquid mixture is used as the seed crystal source, it is preferred to quantify silica, alumina and alkali as well as water and subtract the amounts thereof to form a reaction mixture.

As a method of mixing a seed crystal and a reaction mixture, various methods can be adopted. For instance, a typical method is one in which a seed crystal is added to a reaction mixture at an initial stage and the reaction mixture is subjected to heat treatment at a predetermined temperature for a predetermined time. Alternatively, it's also effective to use a method in which a reaction mixture containing no seed crystal is subjected to heat treatment at a predetermined temperature for a predetermined time, then a seed crystal is added to the reaction mixture, and the reaction mixture is further subjected to heat treatment for crystallization at a predetermined temperature for a predetermined time. In this case, when Z1 and Z2 described above are used in combination, it is sufficient to subject a reaction mixture to which none of Z1 and Z2 are added to heat treatment at a predetermined temperature for a predetermined time, then add Z1 and Z2 to the reaction mixture, and then further subject the reaction mixture to heat treatment for crystallization at a predetermined temperature for a predetermined time. As a condition for heating a reaction mixture containing no seed crystal at an initial stage, it is preferred to set the heating temperature to 100° C. or more and 150° C. or less. As to heating time, it is preferred to set it to 1 hour or more and less than 10 hours. Pressure is set to autogenous pressure. Meanwhile, as to the heating condition when the seed crystal is added to the reaction mixture to crystalize zeolite, it is preferred to set the heating temperature, for instance, to 100° C. or more and less than 200° C. in an autoclave. As to heating time, it is preferred to set it to 1 hour or more and 80 hours or less, in particular, 1 hour or more and 75 hours or less. Pressure is set to autogenous pressure.

The $SiO_2/Al_2O_3$ ratio of the seed crystal used in producing a green beta according to the present embodiment, e.g., the seed crystal of <4> or the seed crystal of <10>, is preferably in a range of 8 or more and 30 or less, more preferably 10 or more and 25 or less. Within this range, it is also possible to use the seed crystal obtained by de-alumination. Further, the cations contained in the seed crystal are not particularly limited, so far as the cations are ions other than the ions of organic atomic groups.

As to the reaction mixture to be mixed with the seed crystal, a mixture obtained by mixing a silica source, an alumina source, an alkali source and water so that the obtained mixture has the molar ratios indicated in (a) or (b) below is preferred.

(a)
$SiO_2/Al_2O_3$=40 to 200, in particular, 44 to 200
$Na_2O/SiO_2$=0.24 to 0.4, in particular, 0.25 to 0.35
$H_2O/SiO_2$=10 to 50, in particular, 15 to 25

(b)
$SiO_2/Al_2O_3$=8 to 40, in particular, 10 to 30
$Na_2O/SiO_2$=0.05 to 0.3, in particular, 0.1 to 0.3
$H_2O/SiO_2$=5 to 50, in particular, 10 to 25

As the silica source used to obtain the reaction mixture having the above-mentioned molar ratios, silica per se and a silicon-containing compound that can generate a silicate ion in water can be used. To be specific, the silica source may include wet process silica, dry process silica, colloidal silica, sodium silicate, and an aluminosilicate gel. These silica sources may be used independently or by combining two types or more. Among these silica sources, it is preferable to use the silica (silicon dioxide) or the aluminosilicate gel in that the beta zeolite can be obtained without an unnecessary by-product.

As the alumina source, for instance, a compound containing soluble aluminate may be used. To be specific, the alumina source may include sodium aluminate, aluminum nitrate, aluminum sulfate, and so on. Further, aluminum hydroxide or aluminosilicate gel is also one of the alumina sources. These alumina sources may be used independently or by combining two types or more. Among these alumina sources, it is preferable to use sodium aluminate or aluminosilicate gel in that the beta zeolite can be obtained without an unnecessary by-product (for instance, sulfate or nitrate or the like).

As the alkali source, for instance, sodium hydroxide may be used. When the sodium silicate is used as the silica source or when the sodium aluminate is used as the alumina source, the sodium that is an alkali metal component contained therein is simultaneously considered as NaOH, and is also an alkaline component. Thus, $Na_2O$ described above is calculated as the sum of all the alkaline components in the reaction mixture.

For an addition sequence of the raw materials, when the reaction mixture is prepared, a method of easily obtaining a uniform reaction mixture may be employed. For example, the alumina source is added to and dissolved in a sodium hydroxide aqueous solution under room temperature, and then the silica source is added and mixed by agitation. Thereby, the uniform reaction mixture can be obtained. The seed crystal can be added while being mixed with the silica source or after the silica source is added. Afterwards, the reaction mixture is agitated and mixed for that the seed crystal is uniformly dispersed. When the aluminosilicate gel is used as the alumina source, a typical method is one in which the aluminosilicate gel is added to water in which a seed crystal is dispersed to obtain a gel slurry and finally an aqueous sodium hydroxide solution is added, but the sequence of addition is not limited. A temperature when the reaction mixture is prepared is also not particularly limited as well, and the reaction mixture may generally be prepared at room temperature (20 to 25° C.)

As described above, after the seed crystal of beta zeolite (<10> in FIG. 1) is prepared, it is possible to produce a green beta in one of the order of <10>, <5>, <6> and <9>, the order of <10>, <5>, <7>, <6> and <9> and the order of <10>, <5>, <7>, <8> and <9>. Generally, the reaction mixture is heated by a static condition without agitation. Agitation can be conducted, for instance, at any time throughout the time period when a mixture of the seed crystal with the reaction mixture is heated. In this case, when Z2 and Z1 are used in combination as described above, agitation can be conducted over the time period when a mixture of Z1 and Z2 with a reaction mixture is heated.

When agitation is conducted in a crystallization process, heating is provided preferably after aging, because crystallization easily proceeds. The aging refers to a process of holding the reaction mixture at a lower temperature than a reaction temperature for a given time. As the effects of the aging, prevention of generation of impurities as by-products, enablement of heating during agitation without generation of impurities as by-products, and increased reaction rate are known but the mechanism of aging is not necessarily clear. The temperature and time of aging are set so that the afore-mentioned effects are maximized. In the present embodiment, aging can be performed in a range of from room temperature (20° C.) or more to 100° C. and from 5 hours to 1 day.

Whichever of the static method and the agitation method is adopted, after the seed crystal and the reaction mixture are mixed with each other, heating can be provided at a temperature in a range of preferably 100° C. or more and 200° C. or less, more preferably 120° C. or more and 180° C. or less, under an autogenous pressure. Adopting a temperature of 100° C. or more enables crystallization rate to be sufficiently increased, and thereby it is possible to increase crystallization efficiency of the desired green beta. On the other hand, since adopting a temperature lower than 200° C. enables the synthesis of the green beta without using an autoclave having high pressure resistance capacity, it is economically advantageous. Further, generation of excess amount of impurities is prevented to an excessive degree is less easy to take place. The heating time is not critical in the present production method, and the heating may be performed until the beta zeolite having sufficiently high crystallinity is created. Generally, the beta zeolite having satisfactory crystallinity is obtained by heating of about 5 to 150 hours.

When the agitation method is employed, the agitation method and conditions are not particularly limited. Even when the static method is adopted during the crystallization reaction, it is preferred to agitate the reaction mixture in the temperature-elevating period, in order to homogenize the temperature of reaction mixture. Further, in order to mix the seed crystal with the reaction mixture to a uniform state, to control the particle size of the desired green beta, or to decrease adhering amount to a reactor wall, it is also effective to agitate at a low speed or to perform intermittent agitation, during the crystallization reaction.

After completion of heating, powder of the synthesized crystal is separated from a mother liquid by filtration, then washed with water or warm water, and dried. Since the thus-obtained green beta does not contain an organic substance in a dried state, calcination is unnecessary. Once dehydrated, such a green beta can be used as an adsorbent or the like. Further, when the green beta is used as a solid acid catalyst, for instance, $Na^+$ ion in the crystal is exchanged for $NH_4^+$ ion, and then the crystal is calcined, and thereby the crystal can be used as $H^+$ form.

The green beta obtained by the present production method can be suitably used, for instance, as an adsorption separating agent in various industrial fields or a catalyst in petrochemical industry, taking advantage of its large pore size and pore volume or solid acid characteristics.

EXAMPLES

Hereinafter, the present invention will be described in greater detail by examples. However, the scope of the present invention is not limited to such examples. Analytical instruments used in the Examples and Comparative Examples below are as follows.
Wet Jet Mill: Star Burst HJT-25001E, 245 MPa manufactured by Sugino Machine Corp.
Particle size distribution analyzer: Nano particle size distribution analyzer, SALD-7500nano manufactured by Shimadzu Corporation, light source: semiconductor laser 405 nm Powder X-ray diffractometer: Ultima IV manufactured by Rigaku Corporation, CuK α-ray used, voltage of 40 kV, current of 30 mA, scan step of 0.02°, and scan speed of 2°/min Composition analysis device: ICP-AES LIBERTY Series II manufactured by Varian Co. Ltd.
Nitrogen adsorption characteristic measuring device: Autosorb-iQ2-MP manufactured by Quantachrome Instruments Co. Ltd. After pre-treated at 400° C. for four hours under vacuum, adsorption isotherm is measured at liquid nitrogen temperature (−196° C.)

Reference Example 1 (Synthesis of Seed Crystal Using an OSDA)

Figure 2:
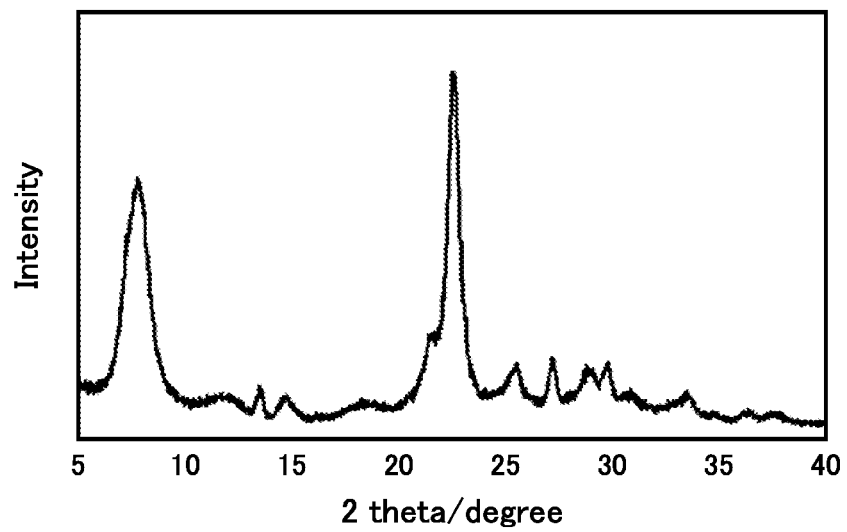
FIG. 2 is an X-ray diffraction pattern of the calcined beta zeolite crystal having a $SiO_2/Al_2O_3$ ratio=24.0 for the seed crystal synthesized in Reference Example 1.
Figure 3:
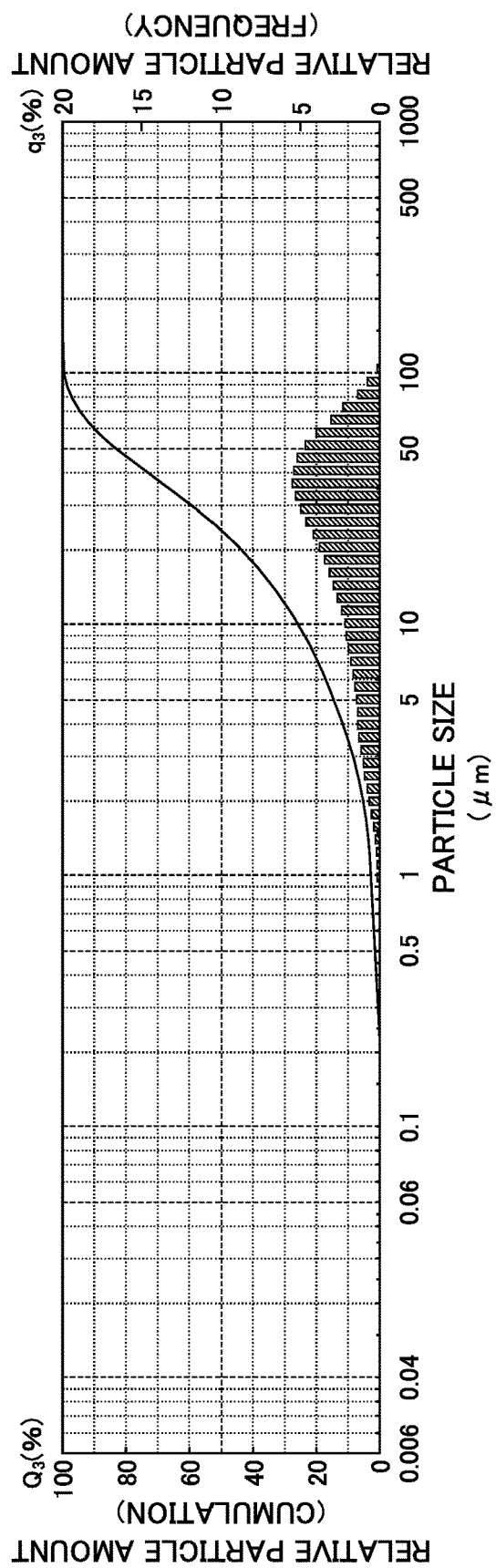
FIG. 3 is a particle size distribution chart of the calcined beta zeolite crystal having a $SiO_2/Al_2O_3$ ratio=24.0 for the seed crystal synthesized in Reference Example 1.

According to a conventional method that tetraethylammonium hydroxide, sodium aluminate and fine powder silica (Cab-O-sil, M-5) are used as the OSDA, the alumina source and the silica source, respectively, a mixture of these was heated under agitation at 165° C. for 96 hours to synthesize a beta zeolite having a $SiO_2/Al_2O_3$ ratio of 24.0. This was calcined at 550° C. for 10 hours under flowing air in an electric furnace to produce a seed crystal containing no organic substance. The X-ray diffraction diagram of the seed crystal after the calcination and the particle size distribution chart thereof measured using the particle size distribution analyzer are indicated in FIGS. 2 and 3, respectively.

Reference Example 2

According to conventionally known methods (methods disclosed in, for instance, Japanese Examined Patent Application Publication No. S63-1244, Japanese Examined Patent Application Publication No. S63-46007, Japanese Examined Patent Application Publication No. H2-32204, Japanese Examined Patent Application Publication No. H2-44771, Japanese Examined Patent Application Publication No. H2-47403, Japanese Examined Patent Application Publication No. H3-45009, Japanese Examined Patent Application Publication No. H3-53251, and Japanese Unexamined Patent Application Publication No. H6-287015), aluminosilicate gels having $SiO_2/Al_2O_3$ ratios of 13.0, 14.0, and 16.0 were prepared by using sodium silicate (No. 3), an aqueous solution of aluminum sulfate, sulfuric acid and purified water. Slurries of the synthesized aluminosilicate gels were filtered using a centrifugal separator, followed by washing with purified water to obtain water-containing aluminosilicate gels. The water contents of these gels were in a range of 68.9 to 70.7% by mass. These gels were stored in sealed containers without drying and were used in the Reference Examples, Examples and Comparative Examples below described.

Reference Examples 3 to 9

Figure 4:
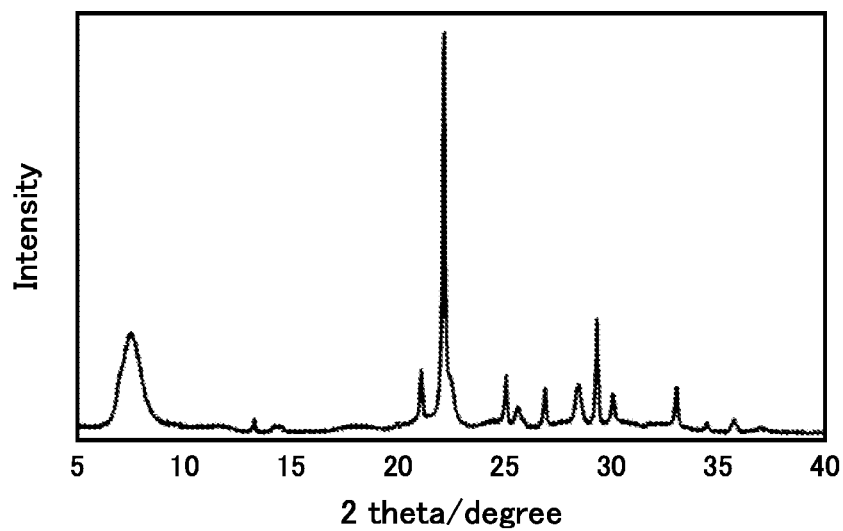
FIG. 4 is an X-ray diffraction pattern of the product synthesized in Reference Example 3.
Figure 5:
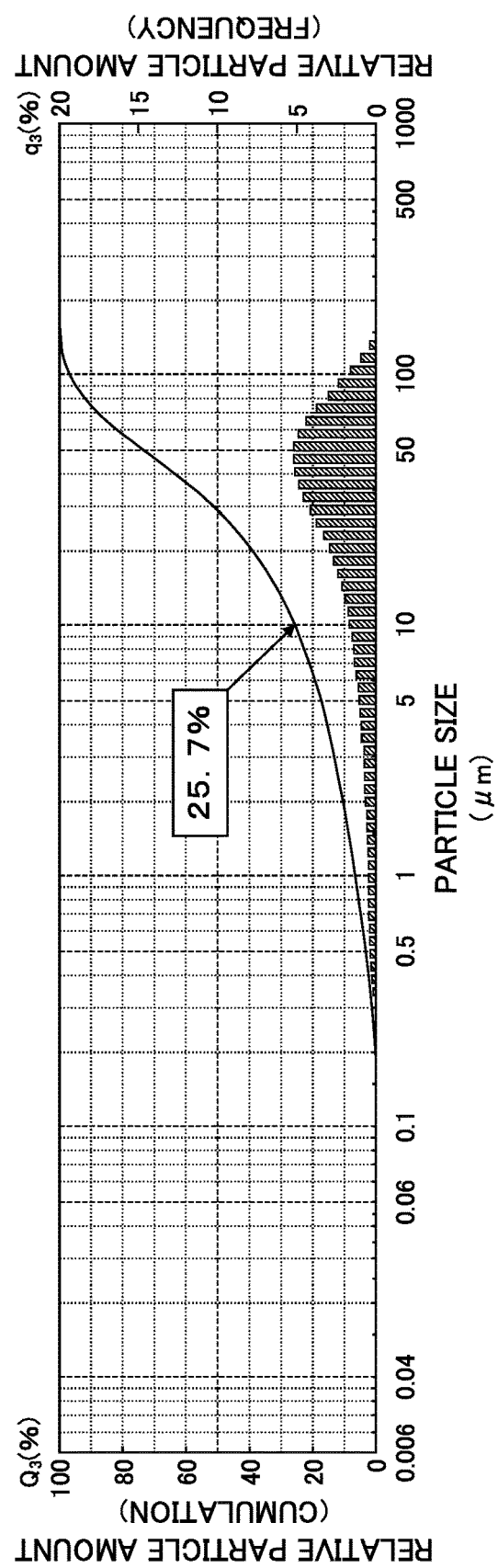
FIG. 5 is a particle size distribution chart of recovered all crystals of the product synthesized in Reference Example 3.
Figure 6:
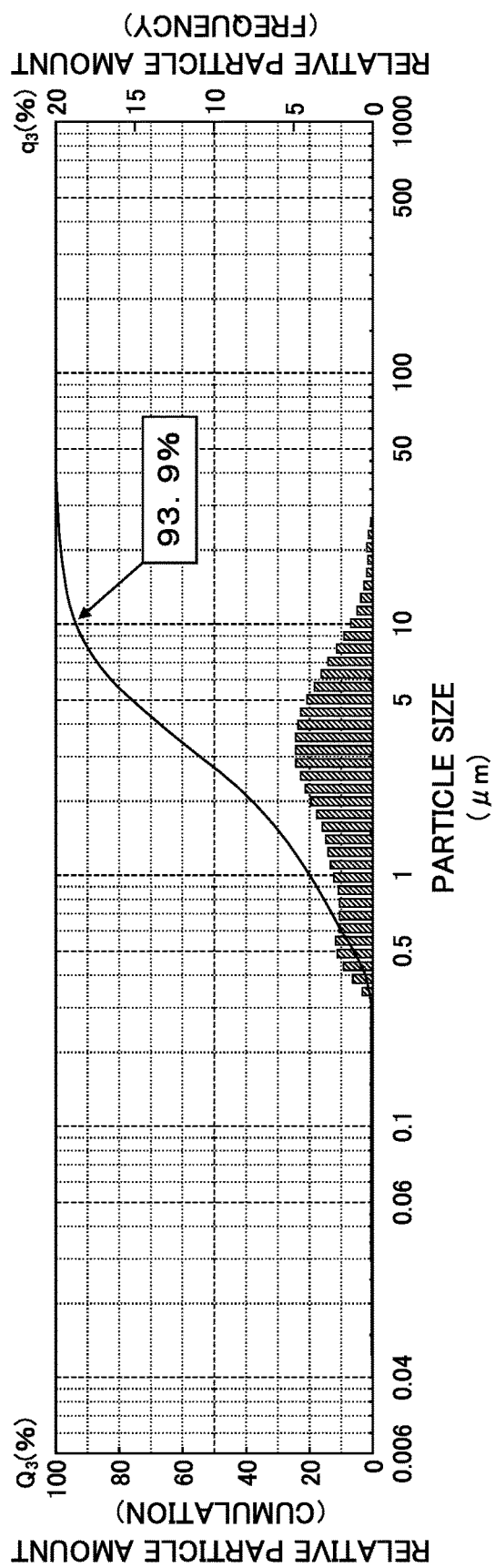
FIG. 6 is a particle size distribution chart of the crystals recovered from filtrate of the product synthesized in Reference Example 3.

By using the aluminosilicate gels prepared in Reference Example 2, seed crystal, 50 w/v % aqueous sodium hydroxide, and purified water, reaction mixtures having compositions indicated in Table 1 were prepared without using an OSDA, to synthesize beta zeolites under the conditions described in Table 1. The seed crystals used in the present Reference Examples are the following three types: (a) the beta zeolite obtained by calcining but not pulverizing the beta zeolite synthesized in Reference Example 1, (b) the beta zeolite HSZ930HOA ($SiO_2/Al_2O_3$ ratio=27.0) manufactured by Tosoh Corporation, and (c) the beta zeolite HSZ931HOA (SiO$_2$/Al$_2$O$_3$ ratio=28.3) manufactured by Tosoh Corporation. The beta zeolites of (b) and (c) are beta zeolites synthesized by using an OSDA. The total weight of the reaction mixtures in each Reference Examples 3 to 9 is 2.4 kg and an autoclave with a volume of 2.6 L was used in each synthesis. After the completion of reaction, a part of generated slurry was filtered using No. 5C filter paper to recover all crystals in the slurry and the recovered crystals were washed with warm water of about 50° C. and dried at 80° C. (recovered all crystals). The products were confirmed to be a beta zeolite by X-ray diffraction measurement, and then the particle size distribution of recovered crystals in the generated slurry was measured and a ratio of particles having a particle size of 10 μm or less was obtained. The results are shown in Table 1. The X-ray diffraction pattern of the product of Reference Example 3 is shown in FIG. 4. The particle size distribution chart of recovered all crystals of the product of Reference Example 3 is shown in FIG. 5. The remaining generated slurry was subjected to separation of crystals from a mother liquid by a centrifugal separator and the crystals were washed with warm water of about 50° C. The opening of filtration cloth used in this operation is shown in FIG. 1. The slurry containing crystals passed through the filtration cloth of a centrifugal separator when separating crystals from the mother liquid and washing crystals was recovered, and the particle size distribution of the crystals was measured to obtain the ratio of particles having a particle size of 10 μm or less. The results are shown in Table 1 and FIG. 6. The slurry containing crystals passed through the filtration cloth was filtered with No. 5C filter paper, and washed with warm water of about 50° C. to recover all crystals, followed by drying at 80° C. (crystals recovered from filtrate).

Example 1

Figure 7:
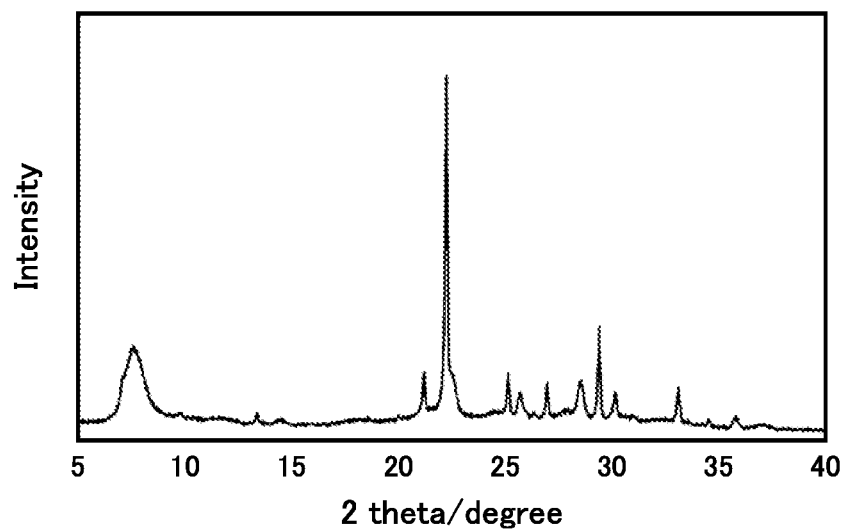
FIG. 7 is an X-ray diffraction pattern of the product synthesized in Example 1.

To an aqueous solution obtained by adding 2.993 g of a 50 w/v % aqueous sodium hydroxide solution to 8.145 g of purified water, was added 20.000 g of the aluminosilicate gel (water content: 68.9% by mass) having a SiO$_2$/Al$_2$O$_3$ ratio=16.0 which was prepared in Reference Example 3. Further, 0.795 g of the beta zeolite comprising crystal particles having a particle size of 10 μm or less in an amount of 95.8% and having a SiO$_2$/Al$_2$O$_3$ ratio=12.2, which was the crystals recovered from filtrate obtained in Reference Example 5, was added as a seed crystal and uniformly agitated to obtain a reaction mixture. This reaction mixture was placed into a pressurizing container made of stainless steel with a volume of 60 ml, sealed, placed statically in an oven, and heated at 140° C. for 67 hours. The product was filtered, washed, dried, and subjected to measurement by the X-ray diffractometer and as a result, it was found that the product was a beta zeolite as shown in FIG. 7. The SiO$_2$/Al$_2$O$_3$ ratio and pore characteristics obtained from the nitrogen adsorption measurement thereof were as shown in Table 2.

Examples 2 to 4

The reaction mixtures having compositions indicated in Table 2 were prepared by using the same raw materials as those used in Example 1, except that the beta zeolites which contained crystal particles having a particle size of 10 μm or less in amounts of 99.2% and 98.1%, respectively, which had SiO$_2$/Al$_2$O$_3$ ratios of 12.0 and 11.8, respectively, and which were the crystals recovered from filtrate obtained in Reference Examples 6 and 7, respectively, were used as the seed crystal. The reaction mixtures were heated under the conditions indicated in Table 2 and as a result, the products and the compositions and pore characteristics thereof were as described in Table 2.

TABLE 1

| Reference Example | Chemical composition of reaction mixture | | | Seed crystal | | | Crystallization conditions | | Filtration-Washing Opening of filtration cloth (Mesh) | Product | | | | | |
|---|---|---|---|---|---|---|---|---|---|---|---|---|---|---|---|
| | SiO$_2$/Al$_2$O$_3$ | Na$_2$O/SiO$_2$ | H$_2$O/SiO$_2$ | Type | Addition amount (mass %) | SiO$_2$/Al$_2$O$_3$ | Temperature (° C.) | Time (h) | | Zeolite | Ratio of particles having a particle size of 10 μm or less of recovered all crystals (%) | Ratio of particles having a particle size of 10 μm or less of crystals recovered from filtrate (%) | SiO$_2$/Al$_2$O$_3$ | BET area (m$^2$/g) | Pore volume (cm$^3$/g) |
| 3 | 16.0 | 0.230 | 15 | HSZ931HOA | 10.0 | 28.3 | 150 | 41 | 800 | Beta zeolite | 25.7 | 93.9 | 11.2 | 654 | 0.24 |
| 4 | 16.0 | 0.230 | 15 | HSZ931HOA | 10.0 | 28.3 | 150 | 41 | 800 | Beta zeolite | 25.7 | 86.7 | 11.2 | 654 | 0.24 |
| 5 | 16.0 | 0.215 | 15 | Reference Example 1 | 10.0 | 24.0 | 150 | 42 | 800 | Beta zeolite | 43.8 | 96.8 | 12.2 | 664 | 0.24 |
| 6 | 16.0 | 0.215 | 15 | HSZ930HOA | 9.0 | 27.0 | 150 | 42 | 800 | Beta zeolite | 38.6 | 99.2 | 12.0 | 667 | 0.24 |
| 7 | 16.0 | 0.215 | 15 | HSZ930HOA | 9.0 | 27.0 | 150 | 42 | 800 | Beta zeolite | 41.1 | 98.1 | 11.8 | 660 | 0.24 |
| 8 | 16.0 | 0.230 | 15 | HSZ931HOA | 10.0 | 28.3 | 150 | 41 | 800 | Beta zeolite | 39.7 | 96.6 | 10.8 | 645 | 0.24 |
| 9 | 16.0 | 0.230 | 15 | HSZ931HOA | 10.0 | 28.3 | 150 | 41 | 400 | Beta zeolite | 39.7 | 81.7 | 10.8 | 645 | 0.24 |

Examples 5 to 7

The reaction mixtures having compositions indicated in Table 2 were prepared by using the same raw materials as those used in Example 1, except that the aluminosilicate gels which had $SiO_2/Al_2O_3$ ratios of 14.0 and 13.0 (water contents were 70.4% by mass and 70.7% by mass, respectively) and which were prepared in Reference Example 2 were used, and the beta zeolites which contained crystal particles having a particle size of 10 μm or less in amounts of 98.1% and 93.9%, which had $SiO_2/Al_2O_3$ ratios of 11.8 and 11.2, respectively, and which were the crystals recovered from filtrate obtained in Reference Examples 7 and 3, respectively, were used as the seed crystal. The reaction mixtures were heated under the conditions indicated in Table 2 and as a result, the products and the compositions and pore characteristics thereof were as described in Table 2.

Examples 8 and 9

The reaction mixtures having compositions indicated in Table 2 were prepared by using the same raw materials as those used in Example 1, except that the aluminosilicate gel which had a $SiO_2/Al_2O_3$ ratio=16.0 (water content was 68.9% by mass) and which was prepared in Reference Example 2 was used, and the beta zeolites which contained crystal particles having a particle size of 10 μm or less in amounts of 98.1% and 96.6%, which had $SiO_2/Al_2O_3$ ratios of 11.8 and 10.8, respectively, and which were the crystals recovered from filtrate obtained in Reference Examples 7 and 8, respectively, were used as the seed crystal. The reaction mixtures were heated under the conditions indicated in Table 2 and as a result, the products and the compositions and pore characteristics were as described in Table 2.

Examples 10 to 12

The aluminosilicate gels which had $SiO_2/Al_2O_3$ ratios of 16.0 and 14.0 (water contents were 68.9% by mass a 70.4% by mass, respectively) and which were prepared in Reference Example 2 were used to form the reaction mixtures having the compositions indicated in Table 2. As the seed crystal, HSZ931HOA (prepared by using an OSDA) and the crystals recovered from filtrate obtained in Reference Examples 3 and 7 were mixed in the ratios indicated in Table 2 and added, and heated under the conditions indicated in Table 2. As a result, the products and the compositions and pore characteristics thereof were as described in Table 2.

Comparative Examples 1 to 3

Figure 8:
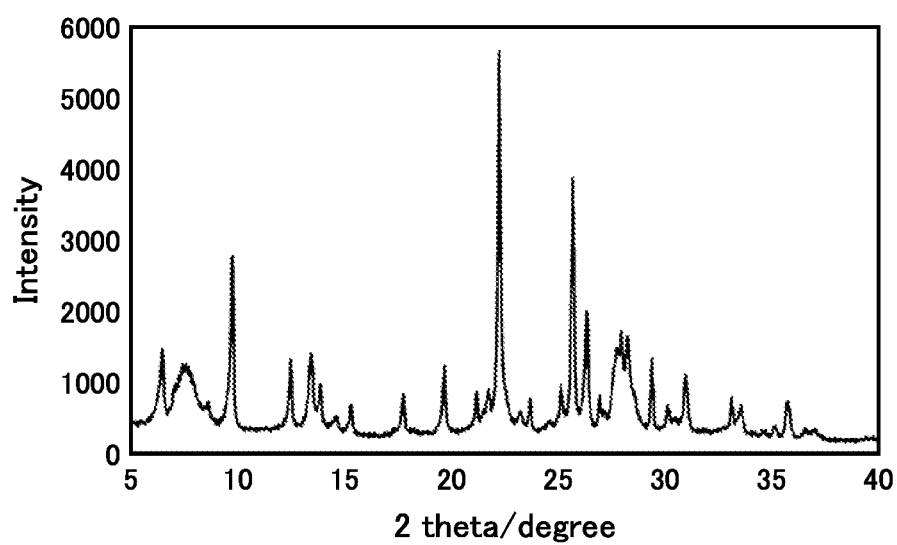
FIG. 8 is an X-ray diffraction pattern of the product synthesized in Comparative Example 1.

The aluminosilicate gel which had a $SiO_2/Al_2O_3$ ratio of 16.0 (the water content was 68.9% by mass) and which was prepared in Reference Example 2 was used to form reaction mixtures having the compositions indicated in Table 3. The recovered crystals obtained in Reference Examples 5, 7 and 3 were added in an amount of 10% by mass as the seed crystal, and heated under the conditions indicated in Table 3. As a result, the products were as described in Table 3. The product of Comparative Example 1 was a mixture of mordenite and beta zeolite, as indicated in FIG. 8.

Comparative Examples 4 and 5

The aluminosilicate gels which had $SiO_2/Al_2O_3$ ratios of 16.0 and 14.0 (the water contents were 68.9% by mass and 70.4% by mass, respectively) and which were prepared in Reference Example 2 were used to form reaction mixtures having the compositions indicated in Table 3. The crystals recovered from filtrate obtained in Reference Examples 9 and 4 were added in an amount of 10% by mass as the seed crystal, and heated under the conditions indicated in Table 3. As a result, the products were as described in Table 3.

Comparative Example 6

The aluminosilicate gel which had a $SiO_2/Al_2O_3$ ratio=13.0 (the water content was 70.7% by mass) and which was prepared in Reference Example 2 was used to form the reaction mixture having the composition indicated in Table 3. The recovered crystals obtained in Reference Example 7 were added in an amount of 10% by mass as the seed crystal, and heated under the conditions indicated in Table 3. As a result, the products were as described in Table 3.

TABLE 2

| Example | Chemical composition of reaction mixture $SiO_2/Al_2O_3$ | $Na_2O/SiO_2$ | $H_2O/SiO_2$ | Seed crystal Type | Addition amount (mass %) | Ratio of particles having a particle size of 10 μm or less (%) | $SiO_2/Al_2O_3$ | Crystallization conditions Temperature (° C.) | Time (h) | Product Zeolite | $SiO_2/Al_2O_3$ | BET area (m²/g) | Pore volume (cm³/g) |
|---|---|---|---|---|---|---|---|---|---|---|---|---|---|
| 1 | 16.0 | 0.215 | 15 | Crystals recovered from filtrate | 15.0 | 95.8 | 12.2 | 140 | 67 | Beta zeolite | 11.6 | 560 | 0.19 |
| 2 | 16.0 | 0.210 | 15 | Crystals recovered from filtrate | 12.5 | 99.2 | 12.0 | 140 | 73 | Beta zeolite | 11.4 | 620 | 0.23 |
| 3 | 16.0 | 0.220 | 15 | Crystals recovered from filtrate | 10.0 | 99.2 | 12.0 | 140 | 69 | Beta zeolite | 11.0 | 672 | 0.24 |
| 4 | 16.0 | 0.225 | 12 | Crystals recovered from filtrate | 10.0 | 98.1 | 11.8 | 150 | 49 | Beta zeolite | 10.6 | 631 | 0.24 |
| 5 | 14.0 | 0.225 | 12 | Crystals recovered from filtrate | 10.0 | 98.1 | 11.8 | 150 | 48 | Beta zeolite | 10.4 | 550 | 0.19 |
| 6 | 14.0 | 0.225 | 12 | Crystals recovered from filtrate | 10.0 | 93.9 | 11.2 | 150 | 48 | Beta zeolite | 10.5 | 555 | 0.19 |
| 7 | 13.0 | 0.225 | 12 | Crystals recovered from filtrate | 10.0 | 98.1 | 11.8 | 150 | 48 | Beta zeolite | 9.4 | 556 | 0.21 |
| 8 | 16.0 | 0.220 | 10 | Crystals recovered from filtrate | 12.5 | 98.1 | 11.8 | 140 | 61 | Beta zeolite | 11.0 | 644 | 0.24 |
| 9 | 16.0 | 0.225 | 12 | Crystals recovered from filtrate | 10.0 | 96.6 | 10.8 | 150 | 50 | Beta zeolite | 10.8 | 625 | 0.23 |
| 10 | 16.0 | 0.225 | 12 | HSZ931HOA Crystals recovered from filtrate | 7.5 2.5 | — 93.9 | 28.3 11.2 | 150 | 49 | Beta zeolite Beta zeolite | 11.6 | 664 | 0.21 |
| 11 | 16.0 | 0.225 | 12 | HSZ931HOA Crystals recovered from filtrate | 5.0 5.0 | — 98.1 | 28.3 11.8 | 150 | 49 | Beta zeolite Beta zeolite | 11.2 | 618 | 0.23 |
| 12 | 14.0 | 0.225 | 12 | HSZ931HOA Crystals recovered from filtrate | 7.5 2.5 | — 93.9 | 28.3 11.2 | 150 | 49 | Beta zeolite Beta zeolite | 10.6 | 562 | 0.21 |

TABLE 3

| Comparative Example | Chemical composition of reaction mixture | | | Seed crystal | | Ratio of particles having a particle size of 10 μm or less (%) | | Crystallization conditions | | Product Zeolite |
|---|---|---|---|---|---|---|---|---|---|---|
| | $SiO_2/Al_2O_3$ | $Na_2O/SiO_2$ | $H_2O/SiO_2$ | Type | Addition amount (mass %) | | $SiO_2/Al_2O_3$ | Temperature (°C) | Time (h) | |
| 1 | 16.0 | 0.225 | 12 | Recovered all crystals | 10.0 | 43.8 | 12.2 | 150 | 49 | Mordenite + Beta |
| 2 | 16.0 | 0.225 | 12 | Recovered all crystals | 10.0 | 41.1 | 11.8 | 150 | 49 | Mordenite + Beta |
| 3 | 16.0 | 0.225 | 12 | Recovered all crystals | 10.0 | 25.7 | 11.2 | 150 | 49 | Mordenite |
| 4 | 16.0 | 0.225 | 12 | Crystals recovered from filtrate | 10.0 | 81.7 | 10.8 | 150 | 49 | Mordenite + Beta |
| 5 | 14.0 | 0.225 | 12 | Crystals recovered from filtrate | 10.0 | 86.7 | 11.2 | 150 | 49 | Mordenite + Beta |
| 6 | 13.0 | 0.225 | 12 | Recovered all crystals | 10.0 | 41.1 | 11.8 | 150 | 49 | Mordenite + Beta |

The invention claimed is:

1. A method for producing a beta zeolite, comprising:
mixing a reaction mixture comprising a silica source, an alumina source, an alkali source and water with a seed crystal comprising a beta zeolite and heating the mixture,
wherein a beta zeolite synthesized without using an organic structure-directing agent and comprising particles having a particle size of 10 μm or less in an amount of 90% or more on a volume basis in the particle size distribution as determined by a laser diffraction/scattering particle size distribution measuring method is used as the seed crystal.

2. The method for producing a beta zeolite according to claim 1, wherein a beta zeolite synthesized using an organic structure defining agent and calcined is further used as the seed crystal.

3. The method for producing a beta zeolite according to claim 2, wherein, in the seed crystal, the content of the beta zeolite synthesized without using an organic structure defining agent is 10% by mass or more and less than 100% by mass.

4. The method for producing a beta zeolite according to claim 3, wherein compositions of the reaction mixture represented by molar ratios are in ranges:
$SiO_2/Al_2O_3$=8 to 40
$Na_2O/SiO_2$=0.05 to 0.3
$H_2O/SiO_2$=5 to 50.

5. The method for producing a beta zeolite according to claim 3, wherein the seed crystal is mixed into the reaction mixture in a state of solid-liquid mixture.

6. The method for producing a beta zeolite according to claim 3, wherein the mixed amount of the seed crystal is 1% by mass or more and 30% by mass or less relative to the mass of the silica source contained in the reaction mixture.

7. The method for producing a beta zeolite according to claim 3, wherein the $SiO_2/Al_2O_3$ ratio of the seed crystal is 8 or more and 30 or less.

8. The method for producing a beta zeolite according to claim 2, wherein compositions of the reaction mixture represented by molar ratios are in ranges:
$SiO_2/Al_2O_3$=8 to 40
$Na_2O/SiO_2$=0.05 to 0.3
$H_2O/SiO_2$=5 to 50.

9. The method for producing a beta zeolite according to claim 2, wherein the seed crystal is mixed into the reaction mixture in a state of solid-liquid mixture.

10. The method for producing a beta zeolite according to claim 2, wherein the mixed amount of the seed crystal is 1% by mass or more and 30% by mass or less relative to the mass of the silica source contained in the reaction mixture.

11. The method for producing a beta zeolite according to claim 2, wherein the $SiO_2/Al_2O_3$ ratio of the seed crystal is 8 or more and 30 or less.

12. The method for producing a beta zeolite according to claim 1, wherein compositions of the reaction mixture represented by molar ratios are in ranges:
$SiO_2/Al_2O_3$=8 to 40
$Na_2O/SiO_2$=0.05 to 0.3
$H_2O/SiO_2$=5 to 50.

13. The method for producing a beta zeolite according to claim 12, wherein the seed crystal is mixed into the reaction mixture in a state of solid-liquid mixture.

14. The method for producing a beta zeolite according to claim 12, wherein the mixed amount of the seed crystal is 1% by mass or more and 30% by mass or less relative to the mass of the silica source contained in the reaction mixture.

15. The method for producing a beta zeolite according to claim 12, wherein the $SiO_2/Al_2O_3$ ratio of the seed crystal is 8 or more and 30 or less.

16. The method for producing a beta zeolite according to claim 1, wherein the seed crystal is mixed into the reaction mixture in a state of solid-liquid mixture.

17. The method for producing a beta zeolite according to claim 16, wherein the mixed amount of the seed crystal is 1% by mass or more and 30% by mass or less relative to the mass of the silica source contained in the reaction mixture.

18. The method for producing a beta zeolite according to claim 16, wherein the $SiO_2/Al_2O_3$ ratio of the seed crystal is 8 or more and 30 or less.

19. The method for producing a beta zeolite according to claim 1, wherein the mixed amount of the seed crystal is 1% by mass or more and 30% by mass or less relative to the mass of the silica source contained in the reaction mixture.

20. The method for producing a beta zeolite according to claim 1, wherein the $SiO_2/Al_2O_3$ ratio of the seed crystal is 8 or more and 30 or less.

* * * * *